(12) United States Patent
Abts et al.

(10) Patent No.: US 10,860,524 B2
(45) Date of Patent: *Dec. 8, 2020

(54) EXTENDED FAST MEMORY ACCESS IN A MULTIPROCESSOR COMPUTER SYSTEM

(71) Applicant: Intel Corporation, Santa Clara, CA (US)

(72) Inventors: Dennis C. Abts, Eleva, WI (US); Robert Alverson, Chippewa Falls, WI (US); Edwin Froese, Burnaby (CA); Howard Pritchard, Chippewa Falls, WI (US); Steven L. Scott, Chippewa Falls, WI (US)

(73) Assignee: Intel Corporation, Santa Clara, CA (US)

(*) Notice: Subject to any disclaimer, the term of this patent is extended or adjusted under 35 U.S.C. 154(b) by 530 days.

This patent is subject to a terminal disclaimer.

(21) Appl. No.: 14/722,821

(22) Filed: May 27, 2015

(65) Prior Publication Data

US 2015/0378961 A1     Dec. 31, 2015

Related U.S. Application Data

(63) Continuation of application No. 12/483,936, filed on Jun. 12, 2009, now Pat. No. 9,069,672.

(51) Int. Cl.
| | |
|---|---|
| *G06F 15/167* | (2006.01) |
| *G06F 12/0813* | (2016.01) |
| *G06F 12/1009* | (2016.01) |
| *H04L 29/08* | (2006.01) |
| *G06F 9/38* | (2018.01) |
| *G06F 13/40* | (2006.01) |

(52) U.S. Cl.
CPC ........ *G06F 15/167* (2013.01); *G06F 12/0813* (2013.01); *G06F 12/1009* (2013.01); *G06F 9/3834* (2013.01); *G06F 13/4009* (2013.01); *G06F 2212/163* (2013.01); *H04L 67/00* (2013.01)

(58) Field of Classification Search
None
See application file for complete search history.

(56) References Cited

U.S. PATENT DOCUMENTS

| | | | | | |
|---|---|---|---|---|---|
| 4,251,860 | A | * | 2/1981 | Mitchell | G06F 9/342 711/215 |
| 4,550,397 | A | * | 10/1985 | Turner | G06F 15/17393 370/355 |
| 4,893,303 | A | * | 1/1990 | Nakamura | G06F 15/17381 370/394 |

(Continued)

FOREIGN PATENT DOCUMENTS

WO        2004/091136 A2        10/2004

*Primary Examiner* — Backhean Tiv
(74) *Attorney, Agent, or Firm* — Compass IP Law PC

(57) ABSTRACT

A multiprocessor computer system comprises a first node operable to access memory local to a remote node by receiving a virtual memory address from a requesting entity in node logic in the first node. The first node creates a network address from the virtual address received in the node logic, where the network address is in a larger address space than the virtual memory address, and sends a fast memory access request from the first node to a network node identified in the network address.

21 Claims, 8 Drawing Sheets

(56) References Cited

U.S. PATENT DOCUMENTS

| | | | | |
|---|---|---|---|---|
| 5,218,687 A * | 6/1993 | Ducousso | G06F 12/123 | 711/128 |
| 5,522,045 A * | 5/1996 | Sandberg | G06F 12/1072 | 709/215 |
| 5,826,057 A * | 10/1998 | Okamoto | G06F 12/0292 | 703/24 |
| 5,860,141 A * | 1/1999 | Washington | G06F 12/0292 | 711/202 |
| 5,928,352 A * | 7/1999 | Gochman | G06F 12/1027 | 711/200 |
| 6,055,617 A * | 4/2000 | Kingsbury | G06F 12/10 | 711/165 |
| 6,119,254 A * | 9/2000 | Assouad | G06F 11/261 | 714/724 |
| 6,366,990 B1 * | 4/2002 | Guddat | G11C 7/1045 | 711/118 |
| 6,523,104 B2 * | 2/2003 | Kissell | G06F 12/1027 | 711/170 |
| 6,801,979 B1 * | 10/2004 | Estakhri | G06F 3/0613 | 365/189.04 |
| 6,854,046 B1 * | 2/2005 | Evans | G06F 12/1036 | 711/203 |
| 6,883,084 B1 * | 4/2005 | Donohoe | G06F 9/3001 | 712/1 |
| 7,181,541 B1 * | 2/2007 | Burton | H04L 49/90 | 370/463 |
| 7,263,600 B2 * | 8/2007 | Sander | G06F 9/3826 | 712/218 |
| 7,487,327 B1 * | 2/2009 | Chang | G06F 12/1081 | 710/3 |
| 9,069,672 B2 * | 6/2015 | Abts | G06F 15/167 | |
| 2002/0078308 A1 * | 6/2002 | Altman | G06F 12/1027 | 711/147 |
| 2002/0144077 A1 * | 10/2002 | Andersson | G06F 12/145 | 711/203 |
| 2002/0144078 A1 * | 10/2002 | Topham | G06F 12/1054 | 711/203 |
| 2003/0074530 A1 * | 4/2003 | Mahalingaiah | G06F 9/3844 | 711/117 |
| 2003/0110205 A1 * | 6/2003 | Johnson | G06F 12/109 | 718/104 |
| 2003/0130832 A1 * | 7/2003 | Schulter | H04L 12/28 | 703/23 |
| 2003/0177332 A1 * | 9/2003 | Shiota | G06F 12/1027 | 711/203 |
| 2004/0010545 A1 * | 1/2004 | Pandya | H04L 67/34 | 709/203 |
| 2005/0038941 A1 * | 2/2005 | Chadalapaka | H04L 67/00 | 710/52 |
| 2005/0129039 A1 * | 6/2005 | Biran | H04L 45/00 | 370/412 |
| 2005/0144422 A1 * | 6/2005 | McAlpine | G06F 12/1458 | 711/206 |
| 2005/0256976 A1 * | 11/2005 | Susairaj | G06F 12/1081 | 710/3 |
| 2006/0075147 A1 * | 4/2006 | Schoinas | G06F 12/1027 | 710/3 |
| 2006/0075285 A1 * | 4/2006 | Madukkarumukumana | G06F 11/0793 | 714/5.11 |
| 2006/0112227 A1 * | 5/2006 | Hady | G06F 12/0893 | 711/130 |
| 2006/0143351 A1 * | 6/2006 | Lee | G06F 13/24 | 710/260 |
| 2006/0149919 A1 * | 7/2006 | Arizpe | G06F 12/1009 | 711/206 |
| 2006/0161709 A1 * | 7/2006 | Davies | G06F 13/404 | 710/268 |
| 2006/0230223 A1 * | 10/2006 | Kruger | G06F 12/1009 | 711/6 |
| 2007/0136506 A1 * | 6/2007 | Traut | G06F 9/45504 | 711/6 |
| 2007/0283108 A1 * | 12/2007 | Isherwood | G06F 12/1009 | 711/154 |
| 2008/0077922 A1 * | 3/2008 | Doring | G06F 12/1491 | 718/100 |
| 2008/0126742 A1 * | 5/2008 | Shupak | G06F 12/1408 | 711/217 |
| 2009/0175294 A1 * | 7/2009 | Orr | H04L 12/18 | 370/463 |
| 2010/0011167 A1 * | 1/2010 | Hady | G06F 12/0815 | 711/130 |
| 2010/0017576 A1 * | 1/2010 | Bomma | G06F 12/10 | 711/163 |
| 2010/0161879 A1 * | 6/2010 | Nation | G06F 12/0813 | 711/103 |
| 2010/0161908 A1 * | 6/2010 | Nation | G06F 12/0284 | 711/147 |
| 2010/0165991 A1 * | 7/2010 | Veal | H04L 49/9094 | 370/392 |
| 2010/0318626 A1 * | 12/2010 | Abts | G06F 12/109 | 709/216 |
| 2015/0378961 A1 * | 12/2015 | Abts | G06F 12/109 | 709/212 |

* cited by examiner

| FMA DESCRIPTOR/FMA USER WINDOW | | | | |
|---|---|---|---|---|
| OFFSET | BITS | NAME | DESCRIPTION | PROTECTION |
| 0x00 | 63:58 | N/A | UNUSED. | |
| | 57:6 | BASE OFFSET | BASE OFFSET USED IN COMPUTING IN THE TARGET NETWORK ADDRESS | R/W |
| 0x08 | 5:0 | MBZ | UNUSED | |
| | 63 | HASH | ENABLE HASHING ON ADDRESS IN OUTGOING NETWORK PACKETS. SEE RAINIER NETWORK ENGINEERING SPEC. SECTION 4.1.2.2.3 | R/W |
| | 62 | ADAPT | ENABLE ADAPTIVE ROUTING OF OUTGOING NETWORK REQUEST PACKETS | |
| | 61 | ResponseAdapt | ENABLE ADAPTIVE ROUTING OF NETWORK RESPONSE PACKETS | |
| | 60 | FMAEnable | ENABLE DESCRIPTOR | |
| | 59 | DTEnable | SET DT BIT IN OUTGOING NETWORK REQUESTS | |
| | 58:35 | N/A | UNUSED | |
| | 34:32 | PEMaskMode | SPECIFIES LOCATION OF THE 16 BIT PE FIELD IN THE SUM OF THE BASE OFFSET AND WINDOW OFFSET | |
| | 31:20 | SrcMemDH[11:0] | SOURCE MEMORY DOMAIN HANDLE, USED FOR GET-TYPE FMA REQUESTS | |
| | 19:8 | RemoteMDH[11:0] | REMOTE MEMORY DOMAIN HANDLE | |
| | 7:5 | N/A | UNUSED | |
| | 4:0 | CMD[4:0] | OPERATION TO PERFORM (E.G. PUT, PutMsg, ETC.). USED IN CONJUNCTION WITH FMA PUT WINDOWS. IGNORED FOR GETS AND FETCHING AMOs. | |
| 0x10 | 63 | VMDHEnable | SET THE VIRTUAL MDH IN THE NETWORK REQUEST PACKET, ENABLING VIRTUAL MDH HANDLING IN REMOTE AND LOCAL ADDRESS TRANSLATION (SEE SECTION 4.3.3). | R/W |
| | 62 | NITEnable | DETERMINES WHETHER THE NIT IS USED TO TRANSLATE THE VIRTUAL PROCESSOR NUMBER INTO A PHYSICAL NETWORK ENDPOINT | |
| | 61:54 | DestProtectTag[7:0] | DESTINATION MEMORY PROTECTION (USED IN REMOTE ADDRESS TRANSLATION AT TARGET). | |
| | 53:46 | SrcProtectTag[7:0] | LOCAL MEMORY PROTECT TAG USED WITH FMA GET-TYPE OPERATIONS | |

FIG. 1

| Offset | Bits | Name | | Description | Access |
|---|---|---|---|---|---|
| | 45:36 | CQHandle[9:0] | | COMPLETION QUEUE HANDLE | |
| | 35:18 | PEBase[17:0] | | BASE PHYSICAL PE. IGNORED UNLESS NTTEnable IS SET. SECTION 4.5. | |
| | 17:0 | NPES[17:0] | | NUMBER OF PEs ASSOCIATED WITH THE NIT GROUP. IGNORED UNLESS NTTEnable IS SET. | |
| | 63:51 | N/A | | UNUSED | |
| 0x18 | 50 | HTReqErr | | MALFORMED HT REQUEST TARGETING FMA DESCRIPTOR, USER WINDOW, OR PUT/PUTWC/GET WINDOWS | R/W† |
| | 49 | NPESErr | | NPES VIOLATION (VALID ONLY WHEN NTTEnable BIT SET) | |
| | 48 | SynoidAllocErr | | A SyncID WAS NOT ALLOCATED WHEN A STORE TO A PUT/PUTWC/GET WINDOW OCCURRED | |
| | 47:40 | N/A | | UNUSED | |
| | 39:32 | SSIDsInUse | | NUMBER OF SSIDs ASSOCIATED WITH THE FMA DESCRIPTOR. | |
| | 31:16 | RC | | OUTSTANDING GET COUNTER | |
| | 15:0 | WC | | OUTSTANDING PUT COUNTER | |
| 0x20 | 63:0 | SCRATCH REGISTER 0 | | REGISTERS USED FOR AMOs AND MsgCmpwFlag REQUESTS. | R/W |
| 0x28 | 63:0 | SCRATCH REGISTER 1 | | | |
| 0x30 | 63:0 | AllocSyncID | | ALLOCATE A SOURCE SYNC ID (SSID) FOR THIS DESCRIPTOR. SEE SECTION 4.2.4. | |
| 0x38 | 63:56 | SyncCmp | TYPE | SPECIFIES THE TYPE OF SYNC COMPLETION NOTIFICATION TO BE DELIVERED. | WRITE ONLY |
| | 55:0 | | DATA | DATA TO BE USED TO GENERATE CQE(s) UPON SYNC COMPLETION. USED IN CONJUNCTION WIT AllocSyncID. SEE SECTION 4.2.4. | |
| 0x40 | 63:56 | N/A | | UNUSED | WRITE ONLY |
| | 55:0 | CQWrite | | USED TO WRITE A COMPLETION QUEUE AT A REMOTE NODE. SEE SECTION 0. | |

FIG. 1 (cont.)

Fig. 2

| FMA PRIV MASK | | | |
|---|---|---|---|
| BIT | NAME | DESCRIPTION | DEFAULT |
| 31:18 | N/A | UNUSED | N/A |
| 17 | BaseOffsetMask | SPECIFIES THE MASK FOR BaseOffset FIELD | 0b |
| 16 | HARAMask | SPECIFIES THE MASK FOR HASH, ADAPT, AND RESPONSE ADAPT FIELDS. | 0b |
| 15 | FMAEnableMask | SPECIFIES MASK FOR FMAEnable FIELD | 0b |
| 14 | DTEnablePEMask ModeMask | SPECIFIES MASK FOR PEMaskMode AND DTEnable FIELDS | 0b |
| 13 | SrcMemDHMask | SPECIFIES THE MASK FOR THE SrcMemDH FIELD | 0b |
| 12 | RemoteMDHMask | SPECIFIES THE MASK FOR THE RemoteMDH FIELD | 0b |
| 11 | CmdMask | SPECIFIES THE MASK FOR Cmd FIELD | 0b |
| 10 | VMDHEnableMask | SPECIFIES THE MASK FOR THE VMDHEnable FIELD | 0b |
| 9 | NTTEnableMask | SPECIFIES THE MASK FOR THE NTTEnable FIELD | 0b |
| 8 | ProtectTagMask | SPECIFIES THE MASK FOR THE DestProtectTag AND SrcProtectTag FIELDS | 0b |
| 7 | CQHandleMask | SPECIFIES THE MASK FOR THE CQHandle FIELD | 0b |
| 6 | PEBaseMask | SPECIFIES THE MASK FOR THE PEBase FIELD | 0b |
| 5 | NPESMask | SPECIFIES THE MASK FOR THE NPES FIELD | 0b |
| 4 | ScratchReg0Mask | SPECIFIES THE MASK FOR SCRATCH REGISTER 0 | 0b |
| 3 | ScratchReg1Mask | SPECIFIES THE MASK FOR SCRATCH REGISTER 1 | 0b |
| 2 | AllocSyncIDMask | SPECIFIES THE MASK FOR AllocSyncID FIELD | 0b |
| 1 | SyncCmpMask | SPECIFIES THE MASK FOR SyncCmp FIELD | 0b |
| 0 | CQWriteMask | SPECIFIES THE MASK FOR CQWrite FIELD | 0b |

Fig. 3

| COMMAND | CMD ENCODING | SEMANTICS | FMA WINDOW VALUE | SCRATCH REGISTER 0 | SCRATCH REGISTER 1 |
|---|---|---|---|---|---|
| GET | 0x00 | GET | CMD/CNT/RET ADDR | UNUSED | UNUSED |
| PUT | 0x00 | PUT | DATA TO PUT | UNUSED | UNUSED |
| PUTMSG | 0x10 | PUT | DATA TO SEND | UNUSED | UNUSED |
| AFADD | 0x08 | GET | CMD/CNT/RET ADDR | ADDEND | UNUSED |
| AFADD_C | 0x18 | GET | CMD/CNT/RET ADDR | ADDEND | UNUSED |
| AFAND | 0x09 | GET | CMD/CNT/RET ADDR | AND VALUE | UNUSED |
| AFAND_C | 0x19 | GET | CMD/CNT/RET ADDR | AND VALUE | UNUSED |
| AFOR | 0x0A | GET | CMD/CNT/RET ADDR | OR VALUE | UNUSED |
| AFOR_C | 0x1A | GET | CMD/CNT/RET ADDR | OR VALUE | UNUSED |
| AFXOR | 0x0B | GET | CMD/CNT/RET ADDR | XOR VALUE | UNUSED |
| AFXOR_C | 0x1B | GET | CMD/CNT/RET ADDR | XOR VALUE | UNUSED |
| AFAX | 0x0C | GET | CMD/CNT/RET ADDR | AND MASK | XOR MASK |
| AFAX_C | 0x1C | GET | CMD/CNT/RET ADDR | AND MASK | XOR MASK |
| CSWAP | 0x0D | GET | CMD/CNT/RET ADDR | COMPERAND | SWAPERAND |
| CSWAP_C | 0x1D | GET | CMD/CNT/RET ADDR | COMPERAND | SWAPERAND |
| AADD | 0x08 | PUT | ADDEND | UNUSED | UNUSED |
| AADD_C | 0x18 | PUT | ADDEND | UNUSED | UNUSED |
| AAND | 0x09 | PUT | AND VALUE | UNUSED | UNUSED |
| AAND_C | 0x19 | PUT | AND VALUE | UNUSED | UNUSED |
| AOR | 0x0A | PUT | OR VALUE | UNUSED | UNUSED |
| AOR_C | 0x1A | PUT | OR VALUE | UNUSED | UNUSED |
| AXOR | 0x0B | PUT | XOR VALUE | UNUSED | UNUSED |
| AXOR_C | 0x1B | PUT | XOR VALUE | UNUSED | UNUSED |
| AAX | 0x0C | PUT | andMask/xorMask | UNUSED | UNUSED |
| AAX_C | 0x1C | PUT | andMask/xorMask | UNUSED | UNUSED |

*Fig. 9*

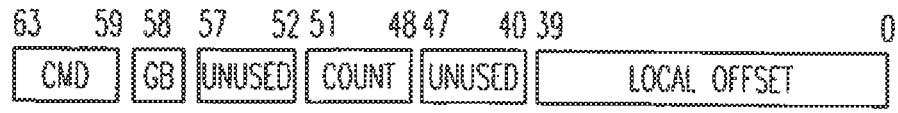

Fig. 10

| BITS IN TYPE SUBFIELD | ACTION TAKEN BY GEMINI |
|---|---|
| 00000000b | RELEASE THE ACTIVE SSID ASSOCIATED WITH THIS DESCRIPTOR. NO LOCAL OR REMOTE CQEs ARE GENERATED. |
| 00000001b | RELEASE THE ACTIVE SSID ASSOCIATED WITH THIS DESCRIPTOR. DELIVER CQE TO LOCAL CQ SPECIFIED BY CQH IN FMA DESCRIPTOR UPON COMPLETION OF SYNCHRONIZATION OF CURRENT FMA REQUEST STREAM. VALID FOR ANY COMBINATION OF FMA REQUESTS. |
| 00000010b | RELEASE THE ACTIVE SSID ASSOCIATED WITH THIS DESCRIPTOR. DELIVER CQE TO REMOTE CQ SPECIFIED BY CQH HANDLE IN MDD AT TARGET PE WHEN DATA IN A MESSAGE HAS BEEN DELIVERED TO TARGET PE. |
| 000001x0b4 | EQUIVALENT TO ACTION TAKEN WHEN TYPE = 00000010b, BUT IN ADDITION DELIVER FLAG TO SPECIFIED LOCATION IN MDD AT TARGET PE WHEN DATA IN A MESSAGE HAS BEEN DELIVERED TO TARGET PE. THIS IS DONE PRIOR TO DELIVERY OF CQE AT TARGET PE. |
| 00000011b | UNION OF TYPE 00000001b AND 00000010b ACTIONS |
| 000001x1b | UNION OF TYPE 00000001b AND 000001x0b ACTIONS |

Fig. 11

EXTENDED FAST MEMORY ACCESS IN A MULTIPROCESSOR COMPUTER SYSTEM

CROSS REFERENCE TO RELATED APPLICATIONS

This application is a continuation of U.S. application Ser. No. 12/483,936, filed Jun. 12, 2009, the entire contents of which are hereby incorporated by reference.

FIELD OF THE INVENTION

The invention relates generally to multiprocessor computer systems, and more specifically to extended fast memory access in a multiprocessor computer system.

BACKGROUND

Most general purpose computer systems are built around a general-purpose processor, which is typically an integrated circuit operable to perform a wide variety of operations useful for executing a wide variety of software. The processor is able to perform a fixed set of instructions, which collectively are known as the instruction set for the processor. Instructions and data are stored in memory, which the processor can selectively read and write.

In more sophisticated computer systems, multiple processors are used, and one or more processors runs software that is operable to assign tasks to other processors or to split up a task so that it can be worked on by multiple processors at the same time. In such systems, the data being worked on is typically stored in a volatile memory that can be centralized or split up among the different processors working on a task.

Volatile memory, such as the dynamic random access memory (DRAM) most commonly found in personal computers, is able to store data such that it can be read or written much more quickly than the same data could be accessed using nonvolatile storage such as a hard disk drive or flash nonvolatile memory. Volatile memory loses its content when power is cut off, so while it is generally not useful for long-term storage it is generally used for temporary storage of data while a computer is running.

A typical random-access memory consists of an array of transistors or switches coupled to capacitors, where the transistors are used to switch a capacitor into or out of a circuit for reading or writing a value stored in the capacitive element. These storage bits are typically arranged in an array of rows and columns, and are accessed by specifying a memory address that contains or is decoded to find the row and column of the memory bit to be accessed.

The memory in a computer usually takes the form of a network of such circuit elements formed on an integrated circuit, or chip. Several integrated circuits are typically mounted to a single small printed circuit board to form a memory module, and the modules in multiprocessor computers can be either centralized such that the various processors or nodes in the system have relatively uniform access to the memory, or can be distributed among the nodes.

When the memory is local to a processor or node that is accessing the memory, the delay in accessing the memory is a significant performance limitation, as it can take tens or even hundreds of processor clock cycles to retrieve data. When the memory is distributed among nodes, the speed at which the memory can be accessed is often orders of magnitude longer, as messages must be passed between nodes on an interconnect network linking the nodes. Management of memory requests to other nodes in a multiprocessor computer system is therefore a significant consideration in designing a fast and efficient multiprocessor computer system.

SUMMARY

One example embodiment of the invention illustrates a computer system employing a fast memory access mechanism to access remote memory stored on another node in a multiprocessor computer system. The fast memory access mechanism is able to translate stores from a local entity such as an AMD64 processor into a network request. A windowing mechanism enables processors with limited address space to efficiently access remote memory in a larger address space. The mechanism enables relatively efficient transfers of small, non-contiguous blocks of data between local and remote memory, enabling faster memory access than may be possible with other mechanisms such as a block transfer request.

In one example, a multiprocessor computer system comprises a first node operable to access memory local to a remote node by receiving a virtual memory address from a requesting entity in node logic in the first node. The first node creates a network address from the virtual address received in the node logic, where the network address is in a larger address space than the virtual memory address, and sends a fast memory access request from the first node to a network node identified in the network address.

BRIEF DESCRIPTION OF THE FIGURES

FIG. 1 is a table of Fast Memory Access descriptors, consistent with an example embodiment of the invention.

FIG. 2 illustrates a network address format, consistent with an example embodiment of the invention.

FIG. 3 is a table of Fast Memory Access privileged bit mask register bits, consistent with an example embodiment of the invention.

FIG. 9 is table showing a summary of Fast Memory Access operations, encoding, and operand locations, consistent with na example embodiment of the invention.

FIG. 10 shows the format of an 8-byte GET Control Word (GCW), consistent with an example embodiment of the invention.

FIG. 11 is a table of interpretation of values stored to the Type subfield of SyncCmp doorbell in the FMA descriptor, consistent with an example embodiment of the invention.

DETAILED DESCRIPTION

Figure 4:
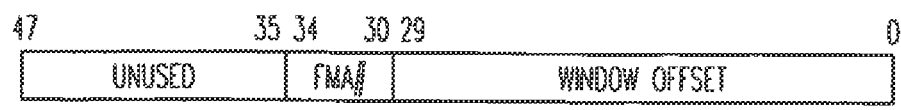
FIG. 4 is a Fast Memory Access local address translation of a hypertransport address, consistent with an example embodiment of the invention.

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments. The following detailed description does not, therefore, limit the scope of the invention, which is defined only by the appended claims.

One example embodiment of the invention comprises a computer system employing a fast memory access mechanism to access remote memory stored on another node in a multiprocessor computer system. The fast memory access mechanism is able to translate stores from a local entity such as an AMD64 processor into a network request. A windowing mechanism enables processors with limited address space to efficiently access remote memory in a larger address space. The mechanism enables relatively efficient transfers of small, non-contiguous blocks of data between local and remote memory, enabling faster memory access than may be possible with other mechanisms such as a block transfer request.

In a more detailed example, a multiprocessor computer system comprises a first node operable to access memory local to a remote node by receiving a virtual memory address from a requesting entity in node logic in the first node. The first node creates a network address from the virtual address received in the node logic, where the network address is in a larger address space than the virtual memory address, and sends a fast memory access request from the first node to a network node identified in the network address.

When accessing memory on remote nodes in a multiprocessor computer system, fast and reliable memory access is a significant factor in overall performance of the computer system. An example embodiment of the invention described below provides a mechanism for fast memory access using a low overhead, user-level direct load/store mechanism to remote memory.

Here, a processor local to the node, such as an AMD64 or other processor having a limited address space requests memory from an address that resides on a remote node, such as from a larger global address space having memory distributed among the nodes in the multiprocessor computer system. A fast memory access mechanism in the interface logic converts the memory request into a properly formatted network request, using a windowing mechanism to allow a processor having a limited address space such as 40-bit addressing to access memory in a larger memory space, such as a 58-bit address space.

Transfers using fast memory access do not directly load or store into memory on other nodes, but in some examples instead generate fast memory access operations into a fast memory access window that are then used to generate remote memory reference requests. The fast memory access mechanism is in some embodiments therefore useful for efficient transfers of small and noncontiguous blocks of data.

In a more detailed example using an integrated circuit logic interface referred to as Gemini, a network address translation mechanism is employed. In order to use this mechanism, memory regions, which are to be accessed using fast memory access (FMA) are registered with the local Gemini node logic. Registration typically involves allocating a Memory Domain Descriptor (MDD) and one or more entries in the Gemini Memory Relocation Table (MRT), as described in greater detail below.

To assist asynchronous event notification, such as completion of FMA requests, etc. Gemini also provides a Completion Queue(CQ) mechanism. The processor interconnect network employs a 3-tuple to specify a logical, remote address on another node in the network. In this example, this 3-tuple is termed the Network Address. Although particular devices on a node may represent both local and possibly remote addresses by device specific mechanisms, all remote memory references made by local node logic use this 3-tuple format, illustrated in FIG. 2.

The network address consists of a 18 bit PE (processing element), a 12 bit Memory Domain Handle (MDH) associated with a target memory segment registered at the target node, and a 40 bit offset into this segment (some additional sideband is not shown). The least significant bit of the PE field specifies the Gemini core at the endpoint ID. The endpoint ID is specified by bits [17:2] of the PE field.

The Memory Domain Handle represents an index into the table of MDDs at the target PE. This handle was obtained by a target process when it made the target memory segment remotely accessible by registering the segment with a Gemini. This MDH is then supplied by external means to processes wishing to access the memory segment. Gemini provides means for virtualization of MDHs and PEs. Virtual PEs used by the application are translated by the Node Translation Table(NTT) to obtain the physical PE. Virtual MDHs are translated at the target using a vMDH table.

The network address used in this chapter maps to the fields in network request packets as follows. The PE[17:2] field of the Gemini network address format maps to the destination[15:0] field in a network request packet. Bits [1:0] of the PE field maps to the DstID field of the network request packet. The offset component of the network address maps to the address[39:2] bits of the network request packet. Address[47:40] bits in the network request packet are currently unused by Gemini. A given physical memory address on a node may be represented by many logical Network Addresses.

Software accesses the fast memory access (FMA) mechanism using three different regions of the Gemini memory map. The first is a set of FMA Descriptors. These are intended to be protected and accessible only when a process is executing in privileged mode. There are 68 FMA descriptors per Gemini core. An FMA descriptor provides the Gemini logic with part of the information required to translate FMA references into system network request packets. For best performance on compute nodes, it is anticipated that software will assign a fixed number of descriptors to each process on the node wishing to access the FMA facility, and that each communication library used by the process will be able to use its own FMA descriptor from the pool of descriptors assigned to the process. A subset of the descriptors will presumably be reserved for the operating system. On service and I/O nodes, potentially all of the FMA descriptors would be reserved for the operating system.

A Completion Queue (CQ) may be associated with an FMA descriptor. In addition to the FMA Descriptors, a set of FMA User Windows is provided. Each FMA User Window is associated with a particular FMA Descriptor. The FMA User Window is an alias to the memory map for the corresponding FMA descriptor. This window allows an application to update components of an FMA Descriptor without a system call. A set of privileged bit mask registers can be used by system software to control access to the various fields of the FMA descriptors when accessed through the FMA User Window. The FMA User Windows are mapped into user space as uncached. The AMD64 insures that stores to the FMA User Window arrive at the Gemini in program order.

The FMA uncached Put (PUT), FMA write-combining PUT (PUTWC) and FMA Get Windows are the third element of the software interface to the FMA mechanism available for host processors. A set of these three windows is associated with each FMA descriptor/FMA User Window pair. All three windows are mapped into user space as uncached. Each window is 1 GB in size. The manner in which windows may be pointed at remotely accessible memory is discussed in detail later.

A process stores into one of these FMA Windows to initiate an FMA request. The address in the window at which the store was made, and the data stored into this address provide Gemini with the remaining information required to build the appropriate network request packet. The other pieces come from values already stored in the FMA descriptor associated with the window, and possibly the Node Translation Table (NTT). The PUTWC Window is an optimized form of the PUT Window. As its name implies, the PUTWC Window is mapped into the process address space as uncached and writecombining memory. This allows for efficient use of HT I/O bandwidth when putting contiguous blocks of data into a remote memory segment. The PUTWC window cannot be used when the data component of the HT packet arising from AMD64 store operations into the window must be interpreted as part of the FMA request, namely non-fetch AMO requests.

The AMD64 does not insure that stores into the PUTWC Window arrive in program order at the Gemini. A memory fence operation is used in cases where ordering of writes to the Gemini needs to be maintained. This typically occurs before storing into the write-combining window, to ensure previously issued stores have completed, and after storing into the write-combining window.

As with the FMA User Window, stores to the GET and PUT Windows arrive in program order at the Gemini without the need for explicit memory fence operations. The AMD64 can be configured to issue HyperTransport writes in either the posted or the non-posted HT channel. The AMD64 allows this configuration to be different for different memory address regions. Writes to FMA in Gemini may be either posted or non-posted. However, the Gemini system design intent does not anticipate that these two types of writes will be interspersed. That is, all writes to FMA are expected to be either posted or non-posted.

FMA Descriptor and FMA User Window

The FMA descriptor address block is intended to only be accessible by a process executing in privileged mode. The memory map for an FMA descriptor is given in the table of FIG. 1. The memory map for the FMA User Window is identical to that of the descriptor.

The first 8-byte block (offset 0x00) of the first descriptor in FIG. 1 holds components of the target network address. The 57-bit value in the Base Offset field is combined with the lower 30 bits of the address at which a store into one of the FMA Windows occurred to produce a 58-bit Global Offset. The value stored in the PEMaskMode field is used to determine where within the Global Offset the 18-bit PE field is specified. Hardware joins the remaining bits above and below the 18-bit PE component to generate the 40-bit offset in the Network Address.

The descriptor has bits for controlling routing of network requests and corresponding responses through the processor interconnect network. The adapt bit specifies whether the adapt bit in the network request packet is to be enabled. Enabling the ResponseAdapt results in setting of the ra bit in network requests packets, thereby allowing for adaptive routing of response packets. Setting the hash bit results in the offset component of the network address (the forty least significant bits) being included in the hash component of the packet routing algorithm, as is shown in the Gemini Network Address format illustrated in FIG. 2.

The SrcMemDH field specifies the 12-bit local memory domain handle (MDH) associated with memory into which response data from FMA Get Requests is to be delivered. The RemoteMDH is the memory domain handle of the remote memory region to be accessed. If the VMDHEnable bit is set, both the SrcMemDH and RemoteMDH represent virtualized MDHs.

The 5-bit Cmd field specifies the value of the Cmd (PUT, GET, AMO) for the network request packet. Note that in the case of FMA GET and fetching-AMO operations, this Cmd is specified in the control word stored into the GET window to initiate the FMA request. Some of the fields in the FMA descriptor will most likely be treated as privileged, and not accessible via the FMA User Window. The DestProtectTag is included in network requests and is used for remote memory reference validation. The SrcProtectTag is used when delivering response data from FMA GET and fetching-AMO requests to local memory. The CQHandle field specifies the Completion Queue associated with the FMA descriptor. The NTTEnable bit specifies whether or not the PE arising from the network address computation is to be translated using the Node Translation Table (NTT).

The DestProtectTag field should not be changed within a message sequence. That is, it should not be changed between a write to the AllocSyncID doorbell and the following write to the SyncCmp doorbell. In certain situations Gemini hardware caches the DestProtectTag value within a message sequence, so unwanted behavior may result if this value is changed.

The rc and wc fields maintain a count of outstanding GET (and fetching AMO) and PUT (and non-fetching AMO) requests. The SSIDsInUse field maintains a count of SSIDs associated with the FMA descriptor. These may be associated with pending CQ events. The HTReqErr, NPESErr, and HTReqErr indicate if an software-induced error state exists for the descriptor. System software can set the fields in this block to zero to zero by storing to block 0x18 of the FMA descriptor. The value itself is ignored by hardware.

There are two 8-byte scratch registers associated with each FMA descriptor. These scratch registers are used for multi-operand AMO requests and for message flag data. The FMA descriptor has additional fields or doorbells for use with messaging and source side synchronization of FMA requests.

The FMA User Window provides user-level access to the FMA descriptors. The elements of the FMA descriptors which are modifiable using this FMA User Window can be controlled using a set of FMA privileged bit mask registers, as shown in FIG. 3. These bit masks specify at a subfield boundary which fields in the FMA descriptors can be access by user-level process via an FMA User Window. There is a bit mask register for each FMA descriptors. Setting a bit to one enables write access to the corresponding field in the FMA User Window, otherwise stores to the field via the FMA User Window have no effect. With the bit disabled, the corresponding field in the FMA descriptor is read as zero via the FMA User Window.

All stores into and loads from the FMA related components of the Gemini memory map—the FMA Descriptors, the FMA User Windows, and the FMA PUT, PUTWC, and GET Windows—are placed into an FMA FIFO queue. Stores into the FMA region use the same HT virtual channel. The queue is sized to amortize the overhead to be able to keep the pipeline of FMA references full. This FIFO queue also serves as a means to order updates of FMA descriptor components with respect to stores to the PUT, PUTWC, or GET windows used to trigger remote memory references, and with respect to loads from different addresses in the FMA component of the memory map. Software can only update fields of the FMA descriptors and user windows using 8-byte aligned, Qword stores. Likewise, reads of fields of the FMA descriptors are restricted to 8-byte aligned, Qword loads.

FMA Local Address Translation

A store into the FMA PUT, PUTWC, or GET windows provides Gemini with several items: the data being stored, the amount of data being stored, and a HT 40 or 48-bit address. Neither address size is sufficient to directly address the terabytes of accessible memory present on large multiprocessor systems such as the one in this example, so an address extension mechanism is adopted. This section describes the HT address to network address extension mechanism.

FIG. 4 shows the default interpretation of the HT address that Gemini receives as a result of a store by a process into an FMA PUT, PUTWC, or GET Window. Bits 34-30 of the physical address correspond to an FMA descriptor. Bits 29-0 are used in conjunction with the Base Offset in the FMA descriptor to generate the network endpoint or processing entity and offset components of the Network Address (see FIG. 2). Note that although bits 47-35 are considered as unused in this context, they are actually reserved and used by the AMD64 processor and Gemini logic in a further embodiment.

Figure 5:
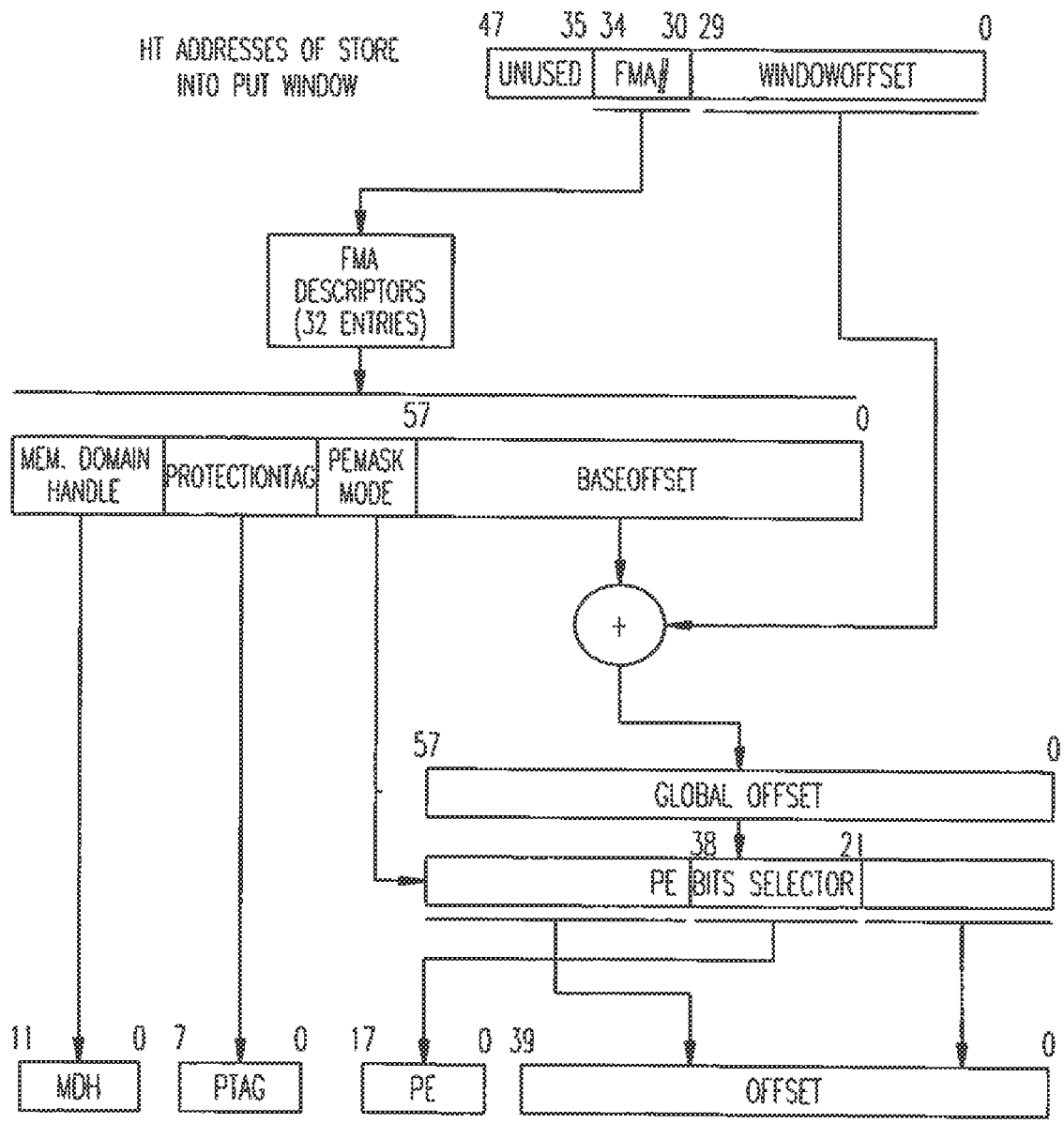
FIG. 5 illustrates use of Fast Memory Access descriptor data and a hypertransport address to generate a put Fast Memory Access network address.

FIG. 5 illustrates the manner in which components of the FMA descriptor are used to augment the HyperTransport address for a PUT request using either the PUT or PUTWC windows. The Base Offset field of the FMA descriptor is added to the lower 30 bits of the address at which a store into one of the FMA Windows occurred (the window offset) to produce a Global Offset. The value stored in the PEMaskMode field is used to determine where in this Global Offset the PE is specified. Node logic joins the remaining bits above and below the PE component to generate the 40-bit offset in the network address.

Figure 6:
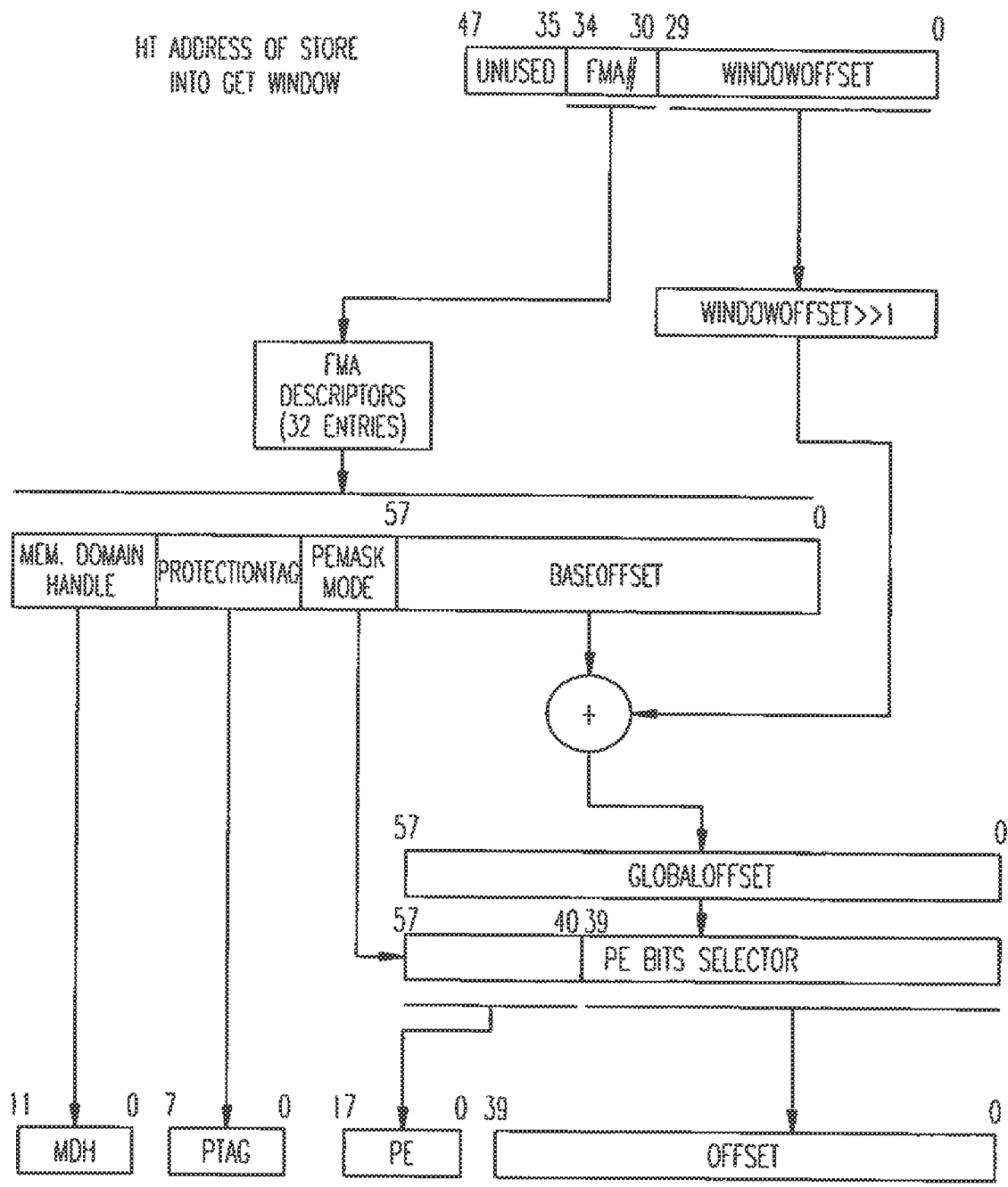
FIG. 6 illustrates use of Fast Memory Access descriptor data and a hypertransport address to generate a get Fast Memory Access network address.

FIG. 6 illustrates the manner in which components of the FMA descriptor are used to augment the HT address for a GET request using the GET window. The operation is identical to that for PUTs, except that the offset into the GET window at which the store occurred is right shifted by 1.

Figure 7:
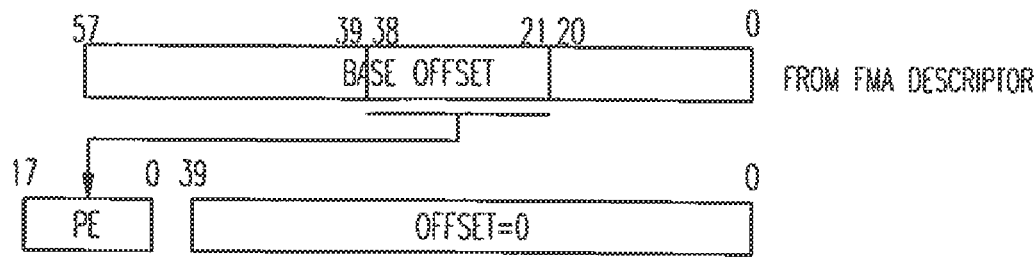
FIG. 7 illustrates Fast Memory Access network address generation for CQwrite and SyncCmp doorbells with different PEMaskMode values, consistent with an example embodiment of the invention.
Figure 8:
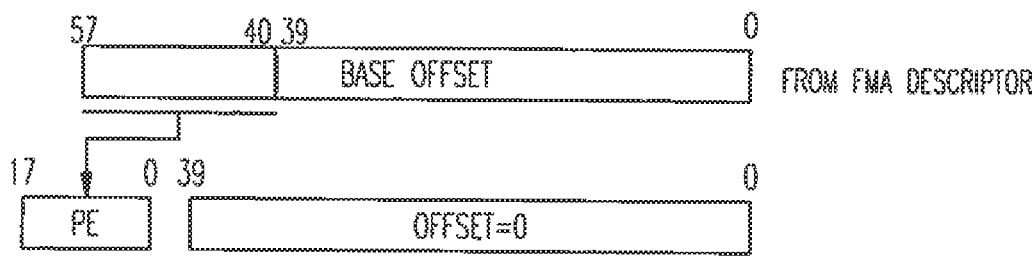
FIG. 8 shows the location of PE and 40-bit offset components of the network address within the global offset for different PEMaskMode values, consistent with an example embodiment of the invention.

FIG. 7 shows how the FMA unit generates a network address for the special FMA doorbell operations that Completion Queues (CQ) at remote endpoints. Storing to the CQWrite doorbell generates a CQWrite network request. Storing to the SyncCmp doorbell may also generate a CQWrite network request, depending on the data stored into the type subfield of the doorbell. No window offset is involved in the computation of the network address in these cases. Rather, the value in the Base Offset field, in combination with the PEMaskMode, is used to determine the target PE. No offset component is required for CQWrite network requests. To reduce complexity of the hardware implementation, the Base Offset must specify a 64-byte cacheline-aligned offset. In other words bits 5:0 of the Base Offset are treated as zero by the hardware. The 30-bit window offset does not have this restriction. The location of the PE field in the Global Offset as a function of the value of the PEMaskMode field of the FMA descriptor is shown in FIG. 8. If the NTTEnable bit is set in the FMA descriptor, the endpoint is a virtual reference, which is translated by the Node Translation Table (NTT) into a physical endpoint.

PEMaskMode 000b and 001b can be used to facilitate Distributed Memory program style addresses schemes. Using mode 00b and a 64 MB MRT pagesize, software can arrange registered memory segments so that bits [39 . . . 37] represent local PE bits of a global address. Likewise mode 01b and a 2 MB MRT pagesize allows for software to arrange exported memory segments so that bits [34 . . . 33] represent local PE bits of a global address. The other PEMaskMode values allow for efficient symmetric-address style accesses.

The Gemini windowing system offers considerable flexibility owing to the Base Offset and the ability to place the network endpoint specification at four different locations in the Global Offset. The use of a Base Offset allows for software to efficiently handle cases where the windowing mechanism introduces complications. Rather than computing offsets into the Gigabyte wide window at which to issue stores, software can optionally chose to update the Base Offset to point to the cacheline offset of the target address and issue a store at the appropriate offset into the cacheline (for Gets the offset into the GET window is left-shifted by 1). In this sense the Gemini windowing mechanism can be treated as a short, up to 16 Dword element stride 1 vector store, with the Base Offset specifying the address at which the vector store begins.

FMA Windows and Remote Memory References

A process generates remote memory references by storing into one of the FMA windows. This section describes this procedure in more detail.

A process generates PUT remote memory references by storing into either the PUT or PUTWC windows. The offset into the window is used in the manner shown in FIG. 5 to specify the location in the memory region at the target where the data stored into the window is to be delivered. There are no alignment or size constraints for stores into these windows for PUT operations. Since the PUT and PUTWC windows can also be used for other operations, the cmd field of the FMA descriptor must be updated to the PUT command prior to storing into either window, as shown in FIG. 9.

The procedure for delivering message data to a target is similar to that for simple PUT operations, except that the cmd field must be set to the PUTMSG command prior to issuing stores into either PUT window.

FIG. 6 illustrates the manner in which components of the FMA descriptor are used to augment the HyperTransport address for a GET request using the GET window. The operation is similar to that for PUTs, except that a store of an 8-byte GET Control Word (GCW) into the window provides information to Gemini about the type of Get operation. The 5-bit Cmd field specifies the type of GET operation (simple get or fetching AMO). The local offset field specifies the offset into the local memory domain where the response data will be returned. This offset must be Dword-aligned, i.e. bits 1:0 of this offset must be zero. The GB bit can be used to facilitate getting of contiguous blocks of data without having to modify the local offset field for every GET request. Its operation will be discussed below. The count field is an n−1 count indicating the total number of Dwords to be transferred. A count of 0=1 Dword; a count of 15d=16 Dwords. The format of the GCW is shown in FIG. 10.

The fact that a GCW is 8-bytes, and the requirement that Dword-aligned Gets be allowed, introduces a minor complication. For the GET window, the window Qword offset at which the store occurs represents a Dword offset. Computation of the Global Offset thus works as follows. The lower 30 bits of the address at which a store into one of the FMA Windows occurred is shifted right by 1 by the FMA hardware. The resulting value is then added to the Base Offset to produce a Global Offset. The value stored in the PEMaskMode field is used to determine where in this Global Offset the PE is specified. Hardware joins the remaining bits above and below the PE component to generate the 40-bit offset in the Network Address.

Hardware does not permit a FMA Get request to result in generation of multiple HT requests at the target node. Consequently, the allowed value for the count field in a GCW is dependent on the address at which the value was stored. For instance, if the store occurs at an address 0x - - - 40 in the GET window, the computed target address is aligned to 0x - - - 20. Owing to HT request formatting rules, no more than 8 dwords can be requested for this alignment. Thus count cannot exceed 7 in this case. The GB bit in the GCW can be used to simplify getting of contiguous blocks of data. When this bit is set, hardware generates the offset into the local memory region (specified by the SrcMemDH field in the FMA descriptor) where data will be returned as follows:

$$\text{offset}=(\text{local offset}+(\text{get window offset}>>1)) \% 2^{40}$$

This mode would presumably be most effective for GETs of contiguous cachelines of data from a remote endpoint.

FMA Windows and Atomic Memory Operations

Atomic memory operations (AMOs) can be divided into two classes: those with PUT semantics, for which no data is returned in the response; and those with GET semantics, for which data is returned in the response. AMOs with Get semantics are termed Fetching AMOs in this document. AMOs with PUT semantics are handled by first setting the Cmd in the FMA descriptor to the appropriate value (see FIG. 9). The actual operation is initiated by storing the 8-byte operand into the PUT window. The PUT address translation scheme is used. It is an error to use the PUTWC window for AMO operations. The AAX operation is a special case as it involves two 8-byte operands. In this case, the SSE2 MOVDQA instruction can be used to store the DQWORD into the PUT window. The andMask is encoded in the lower 63:0 bits of the XMM register. The xorMask is stored in bits 127:64 of the register. AAX operations can only target 16 byte-aligned addresses. The AFAX instruction may be used in the case that the target address is not aligned at a 16-byte boundary.

Fetching AMOs involve multiple operands. The scratch registers associated with an FMA descriptor are used as temporary storage for the operands. The operands are stored into the scratch registers. The operation is initiated by storing an 8-byte value into the GET window at the appropriate offset. The encoding of the 8-byte value is identical to that for FMA GET operations, except that the Cmd bits 63:59 are set to the appropriate AMO command encoding.

FIG. 9 summarizes the supported FMA remote memory access requests, the encoding value to be used either in the Cmd of the FMA descriptor in the case of FMA requests with PUT semantics, or in the Cmd component of the 8 byte data field (see FIG. 10) in the case of FMA requests with GET semantics, and which operands to store in which scratch registers in the fetching AMOs.

Gemini-based atomic memory operations are not coherent with respect to native AMD64 atomic memory operations. The AMO cache on the Gemini is not kept coherent with respect to updates of local memory by processors or other devices on the HT fabric within a node. Host memory is kept coherent with the cache with respect to incoming network requests, however.

Owing to the facts that the AMD64 GART can allow for multiple GART addresses to alias the same underlying physical address in local memory, and that the AMO cache cannot distinguish between GART and physical addresses, precautions must be taken by software when it is possible that AMO requests may target remote memory regions which are multiply registered with the GART.

AMO commands have an optional caching attribute, denoted by the _C notation in FIG. 9. This attribute may be used for AMOs targeting synchronization variables for which there is spatial, but not temporal, locality. The AMO cache retains the value in cache indefinitely. Note that the default behavior of the cache is to write the value back to host memory and invalidate the cacheline when there are no more incoming AMO references which target the cached address. When the caching attribute is used, software is responsible for invalidating the AMO cache when required.

FMA Source Side Synchronization and Messaging

Gemini FMA supports two source-side remote memory reference synchronization methods for tracking such references to determine when: 1) PUT-type requests to a remote endpoint have reached a globally ordered point at the remote endpoint, and 2) when responses to GET-type requests have reached a globally ordered point in the local node.

One of the source side synchronization methods relies on the Source Side Completion Notification (SSCN) facility on Gemini. The SSCN facility can be used for fine-grained tracking of individual streams of FMA requests. A single stream may include any combination of PUT, GET, or AMO requests targeting any combination of PEs. Prior to storing into an FMA descriptor's PUT(WC) or GET windows, a Synchronization Sync ID (SSID) must be allocated for the descriptor. Stores into these windows are dropped by hardware if a SSID is not allocated to the descriptor.

A process first allocates a SSID for an FMA descriptor by storing an 8-byte value to the descriptor's AllocSyncID doorbell. This triggers the Gemini to associate a SSID with the FMA descriptor. The SSID is in an active state. The subsequent stores to the FMA descriptor's PUT(WC) or GET windows and the returning network responses are tracked by the SSID structure. Upon completion of a stream of FMA references, a process stores an 8-byte value to the SyncCmp doorbell in the FMA user window. Bits 55:0 of this value will be later used by Gemini to generate a local Completion Queue Entry (CQE). Bits [63:56] are set to 00000001b as indicated in FIG. 11. The value of the CQH field in the FMA descriptor at the time of the store to the SyncCmp doorbell is used to determine which CQ will receive the CQE.

A process allocates a new SSID for the FMA descriptor before beginning a new sequence of stores to the descriptor's PUT(WC) or GET windows. Following the store to the SyncCmp doorbell, the SSID is said to be in a waiting state—subsequent network references using this FMA descriptor do not increment the structure's outstanding reference counter(s). The SSID is still associated with the FMA descriptor, however. When all network responses associated with the original sequence of store operations have been received, the 56 least significant bits of the 8-byte value are used to generate the 56 least significant bits of a CQE which is delivered to the CQ specified by the CQH stored in the FMA descriptor at the time the process stored to the Sync-Cmp doorbell. The SSID is now in a free state. Gemini dissociates the SSID from the FMA descriptor and places it back on the free pool of Message/Sync IDs. An FMA descriptor may be associated with a number of waiting SSIDs. Only a single SSID can be active for a given descriptor, however. Stores to the AllocSyncID doorbell while a descriptor is associated with an active SSID are ignored.

A process may manually dissociate an active SSID from the descriptor by storing to the SyncCmp doorbell with the Type component of the 8-byte data value set to 00000000b. Bits 55:0 of the value are ignored. FMA also provides a coarse grain gsync-release/acquire synchronization model similar to that supported on, for example, the CRAY X2 system.

Software can use the rc/wc counters of an FMA descriptor to monitor the number of outstanding network requests associated with the descriptor. The rc counter tracks the number of outstanding GETS and fetching AMO requests associated with the descriptor. wc tracks the number of outstanding PUT and non-fetching AMO requests associated with the descriptor. The rc/wc counters are not cacheable, and polling them for memory synchronization purposes normally is not as efficient as using the SSID based notification mechanism.

Note that a SSID is still associated with the FMA descriptor even if software chooses to use the rc/wc counters for source side synchronization. Gemini provides several methods for one-way delivery of a message from a sender process at source PE to a receiver process at a target PE using the FMA facility. Software may chose to rely on network ordering of requests to deliver short control messages using FMA. This can be accomplished by setting the hash and adapt bits in the FMA descriptor to 0. This forces the network to insure strict in order delivery of all requests targeting a given PE. Note that setting these bits to 0 will result in poor use of available network bandwidth.

A process then configures the remaining fields in the FMA descriptor and begins storing the message data into the PUT or PUTWC windows. After the message data has been stored, the sender process may optionally send a CQE to the target endpoint by storing an 8-byte value in the CQWrite doorbell in the FMA User Window. Bits [55:0] of this value will be delivered to the CQ at the remote end which is associated with the remote MDH.

Alternatively, software may use the SSCN facility described in the previous section in conjunction with the Receive Message Table (RMT) at the target node to achieve oneway delivery of a message to a target network endpoint. This approach does not rely on any network ordering, and hence allows for higher network bandwidth utilization for longer messages.

To use this mechanism, a sender process takes the following steps. The Cmd field of the FMA descriptor is encoded for PUTMSG. After the remaining fields of the FMA descriptor have been appropriately initialized, the sender process stores an 8-byte value to the AllocSyncID doorbell of the FMA descriptor. This triggers the Gemini to associate a SSID with the FMA descriptor.

The sender begins storing the message data into the FMA descriptor's PUT or PUTWC window. The SSID tracks the number of subsequent network requests and their associated responses. When the sender has finished storing the message data into the chosen window, it stores an 8-byte value to the SyncCmp doorbell in the FMA user window. This 8-byte value is bound to the SSID. Bits [63:56] of this 8-byte value, the Type subfield, specify where notifications are to be delivered following delivery of the message data at the target PE (see FIG. 11).

Following the store to the SyncCmp doorbell, subsequent network references using this FMA descriptor are no longer associated with the SSID. A MsgSendComplete network request is sent to the target PE. This request includes the 8-byte value the sender stored into the SyncCmp doorbell. The 56 least significant bits of this value will be delivered to the CQ at the target PE associated with the MDH specified in the sender's FMA descriptor.

When the SSID has received all outstanding network responses, Gemini dissociates the SSID from the FMA descriptor and places it back on the free pool of SSIDs. The SSID is in a free state.

It is possible that the CQ at the receiver side can be overrun for some types of message patterns. To assist in dealing with this situation, Gemini provides an option to deliver an additional flag to a specified location at the target PE. A sender specifies this option by setting the Type subfield to 00000110b in the 8-byte value stored to the SyncCmp doorbell. Prior to storing to the SyncCmp doorbell, the sender stores the 40-bit offset into the target receiver's registered memory region (specified by the MDH in the sender's FMA descriptor) in scratch register1 of the FMA descriptor. The offset must be qword (8-byte) aligned3. The 8-byte flag is stored into scratch register0. The flag is delivered into local memory at the receiver prior to delivery of a CQE to the receiver's CQ.

When sending a message to a target PE, the sender can also request to be notified when the data has arrived at the target by setting bit 0 of the Type subfield when storing to the SyncCmp doorbell. The SyncCmpData subfield of the 8-byte data stored to this doorbell will also be delivered to the sender's local CQ specified by the CQH field in the FMA descriptor.

The examples presented here show how one embodiment of a computer system employs a fast memory access mechanism to access remote memory stored on another node in a multiprocessor computer system. The fast memory access mechanism is able to translate stores from a local entity such as an AMD64 processor into a network request. A windowing mechanism enables processors with limited address space to efficiently access remote memory in a larger address space. The mechanism enables relatively efficient transfers of small, non-contiguous blocks of data between local and remote memory, enabling faster memory access than may be possible with other mechanisms such as a block transfer request.

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A method comprising:

receiving a memory request from a processor at a first node having a first address space to access memory at a second node having a second address space;

translating the memory request into a network request to enable access of the memory according to the second address space, including creating a network address from a virtual address received in the first node, where the network address is in a larger address space than the virtual address, and the network address includes a processing element field to specify the second node as a network endpoint component based on a window offset; and transmitting the network request from the first node to the second node to access the memory at the second node.

2. The method of claim 1, where the network address includes the processing element field, a memory domain handle, and an offset.

3. The method of claim 2, further comprising sending a fast memory access request from the first node to the second node specified in the network address, wherein the fast memory access request includes the network address.

4. The method of claim 2, wherein the virtual address comprises:

a fast memory access (FMA) descriptor; and the window offset used to generate the network endpoint and offset components of the network address.

5. The method of claim 1, wherein the network address comprises a protection tag.

6. The method of claim 4, wherein fast memory access is used to provide load/store access to remote memory, and a block transfer engine is used to copy remote memory.

7. The method of claim 2, wherein creating a network address from the virtual address comprises looking up at least a portion of the virtual address in a fast memory access table.

8. A multiprocessor computer system, comprising a first node, including one or more processing elements, operable to access memory local to a second node by:

receiving a memory request from a first processing element having a first address space to access memory at the second node having a second address space, including creating, by the first node, a network address from a received virtual address, where the network address is in a larger address space than the virtual address, and the network address includes a processing element field to specify the second node as a network endpoint component based on a window offset;

translating the memory request into a network request to enable access of the memory according to the second address space; and transmitting the network request from the first node to the second node to access the memory at the second node.

9. The multiprocessor computer system of claim 8, where the network address includes the processing element field, a memory domain handle, and an offset.

10. The multiprocessor computer system of claim 8, wherein the first node sends a fast memory access request from the first node to the second node specified in the network address, wherein the fast memory access request includes the network address.

11. The multiprocessor computer system of claim 9, wherein the virtual address comprises:

a fast memory access (FMA) descriptor; and the window offset used to generate the network endpoint and offset components of the network address.

12. The multiprocessor computer system of claim 9, wherein the network address comprises a protection tag.

13. The multiprocessor computer system of claim 10, wherein fast memory access is used to provide load/store access to remote memory, and a block transfer engine is used to copy remote memory.

14. The multiprocessor computer system of claim 9, wherein creating a network address from the virtual address comprises looking up at least a portion of the virtual address in a fast memory access table.

15. A multiprocessor computer node operable to access memory local to a remote node by:

receiving a memory request from a processing element in the multiprocessor computer node having a first address space to access memory at the remote node having a second address space;

translating the memory request into a network request to enable to access of the memory according to the second address space, including creating, by the multiprocessor computer node, a network address from a received virtual address, where the network address is in a larger address space than the virtual address, and the network address includes a processing element field to specify the remote node as a network endpoint component based on a window offset; and transmitting the network request from the computer node to the remote node to access the memory at the remote node.

16. The multiprocessor computer node of claim 15, the network address includes the processing element field, a memory domain handle, and an offset.

17. The multiprocessor computer node of claim 15, wherein the multiprocessor computer node sends a fast memory access to the remote node specified in the network address, wherein the fast memory access request includes the network address.

18. The multiprocessor computer node of claim 16, wherein the virtual address comprises:

a fast memory access (FMA) descriptor; and the window offset used to generate the network endpoint and offset components of the network address.

19. The multiprocessor computer node of claim 16, wherein the network address comprises a protection tag.

20. The multiprocessor computer node of claim 17, wherein fast memory access is used to provide load/store access to remote memory, and a block transfer engine is used to copy remote memory.

21. The multiprocessor computer node of claim 16, wherein creating a network address from the virtual address comprises looking up at least a portion of the virtual address in a fast memory access table.

* * * * *